Oct. 14, 1969      C. J. BADEWITZ       3,472,471
LANDING SITE SELECTION RADAR
Filed Jan. 30, 1967                3 Sheets-Sheet 1

INVENTOR.
CHARLES J. BADEWITZ
BY Knox & Knox

Oct. 14, 1969 C. J. BADEWITZ 3,472,471
LANDING SITE SELECTION RADAR

Filed Jan. 30, 1967 3 Sheets-Sheet 2

*INVENTOR.*
CHARLES J. BADEWITZ
BY Knox & Knox

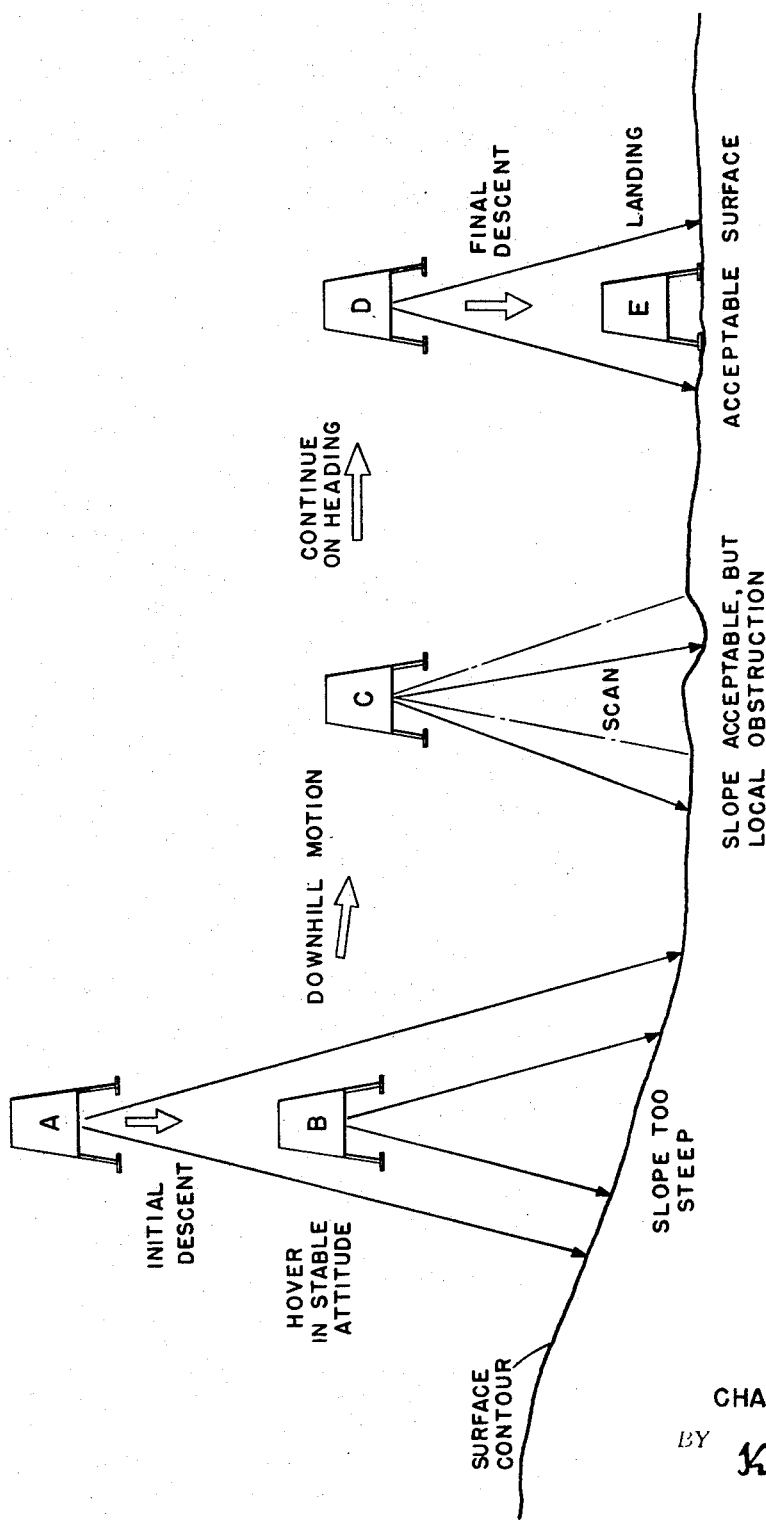

United States Patent Office 3,472,471
Patented Oct. 14, 1969

3,472,471
LANDING SITE SELECTION RADAR
Charles J. Badewitz, San Diego, Calif., assignor to The Ryan Aeronautical Co., San Diego, Calif.
Filed Jan. 30, 1967, Ser. No. 612,561
Int. Cl. B64c *13/50*
U.S. Cl. 244—77                                    7 Claims

ABSTRACT OF THE DISCLOSURE

In landing a space craft or other flight vehicle on unknown terrain, the system first determines the slope of the terrain, then, if the slope is too steep for landing, the vehicle is moved in the downhill direction until an acceptable slope is reached, at which point the surface is scanned for local obstructions before landing is completed.

BACKGROUND OF THE INVENTION

The present disclosure relates to radar guidance and specifically to a radar system which determines the surface characteristics of a proposed landing site. If the immediate site is unsuitable, the vehicle is moved automatically in the most logical direction until the terrain becomes acceptable for landing.

Various radar systems have been developed for maintaining a vehicle in a stable attitude and a controlled descent, usually involving some form of Doppler radar for velocity determination. The basic technique involves multiple beams directed at known angles relative to the vehicle's vertical axis, the slant ranges along the beams and the Doppler shifts measured being used to determine attitude and altitude and velocity, respectively. One particular system of this type is shown and described in my copending application Ser. No. 519,755, filed Jan. 10, 1966 now U.S. Patent No. 3,362,024, entitled Verticality, Altitude and Velocity Sensing Radar.

Other radar systems, also usually of Doppler type, have been developed for contour mapping of terrain, which technique can be used to analyze the terrain surface. However, since payload is usually critical in flight vehicles, particularly spacecraft, it is not desirable to carry both types of radar. The system described herein combines the functions of the two above mentioned systems by a simple addition to and extension of the basic guidance radar.

SUMMARY OF THE INVENTION

When a space craft, or similar flight vehicle, is landing on unknown terrain, it is necessary to know the characteristics of the terrain surfaces, particularly the slope and location of obstructions, such as rocks or pits, which could topple the vehicle. The system utilizes the guidance radar existing in the vehicle to determine the inclination of the terrain surface relative to the vehicle vertical, by comparison of the slant ranges in the multiple radar beams. By referring this inclination to local vertical, which is known from the vehicle's stabilization and guidance system, the actual terrain slope is found. If the slope is too steep for a safe landing, the vehicle is automatically guided in a downhill direction, while the terrain is continuously inspected by the radar, until an acceptable slope or level area is reached. At this point the radar beams are scanned over the surface to detect local roughness or obstructions. If an obstruction is found, the vehicle is moved further in the predetermined downhill direction to avoid any further directional change. When acceptable terrain is located the vehicle is automatically landed by the guidance portion of the radar. The system is very necessary in unmanned vehicles and can be a distinct advantage in manned vehicles, since visibility may be too restricted for a manually controlled landing in safety and hover time is definitely limited by fuel capacity.

BRIEF DESCRIPTION OF THE DRAWINGS

FIGURE 7 is a composite diagram showing the progressive stages of landing a vehicle.

DESCRIPTION OF THE PREFERRED EMBODIMENT

Figure 1:
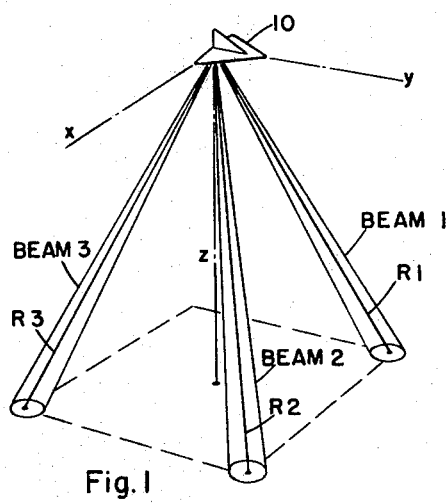
FIGURE 1 is a diagram of the multiple beam configuration.
Figure 2:
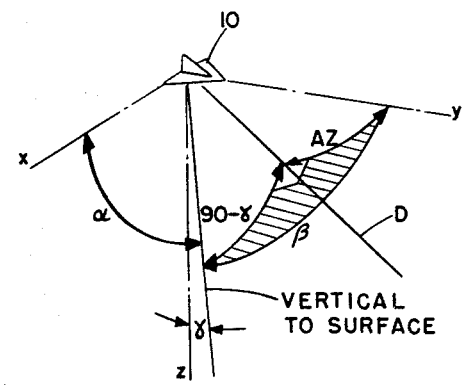
FIGURE 2 is a diagram of the geometry involved in determining surface slope.

For the purpose of this disclosure it is assumed that the vehicle 10 is equipped with an antenna 12 having a multiple beam pattern, in this instance three beams diverging from the vehicle z axis, or vertical. The beams may be produced simultaneously or sequentially, depending on the particular antenna used, both arrangements being well known. The antenna is coupled to a radar computer 14, such as described in the above mentioned copending application, which is capable of maintaining the vehicle in a stable attitude with respect to local vertical and providing continuous altitude data from which the vehicle can be controlled in hover and descent. In the computer the vertical range or altitude is computed from the ranges R1, R2 and R3 measured along the three beams, while continuous computation is made of angles $\alpha$, $\beta$ and $\gamma$ between the terrain vertical and the vehicle axes $x$, $y$ and $z$ to determine the terrain slope. From this data the direction of downhill slope of the surface can be found, which will be in a direction D at some azimuth angle AZ relative to vehicle axis $y$. In FIGURE 2 the shaded area is a right spherical triangle defined by angle $\beta$, the angle between terrain vertical and D, which is 90—$\gamma$, and azimuth angle AZ. Thus it is a simple matter to compute AZ, as follows:

$$\cos \beta = \cos AZ \cos (90-\gamma) = \cos AZ \sin \gamma$$

$$\cos AZ = \frac{\cos \beta}{\cos (90-\gamma)} = \frac{\cos \beta}{\sin \gamma}$$

When $\gamma=0$, the equation becomes indeterminate, which means that there is no slope and the vehicle can be landed in any heading direction, subject to acceptable surface roughness. If the terrain does slope, then once the azimuth angle is computed the vehicle can be turned to the heading 180—AZ, which is the downhill direction.

Figure 3:
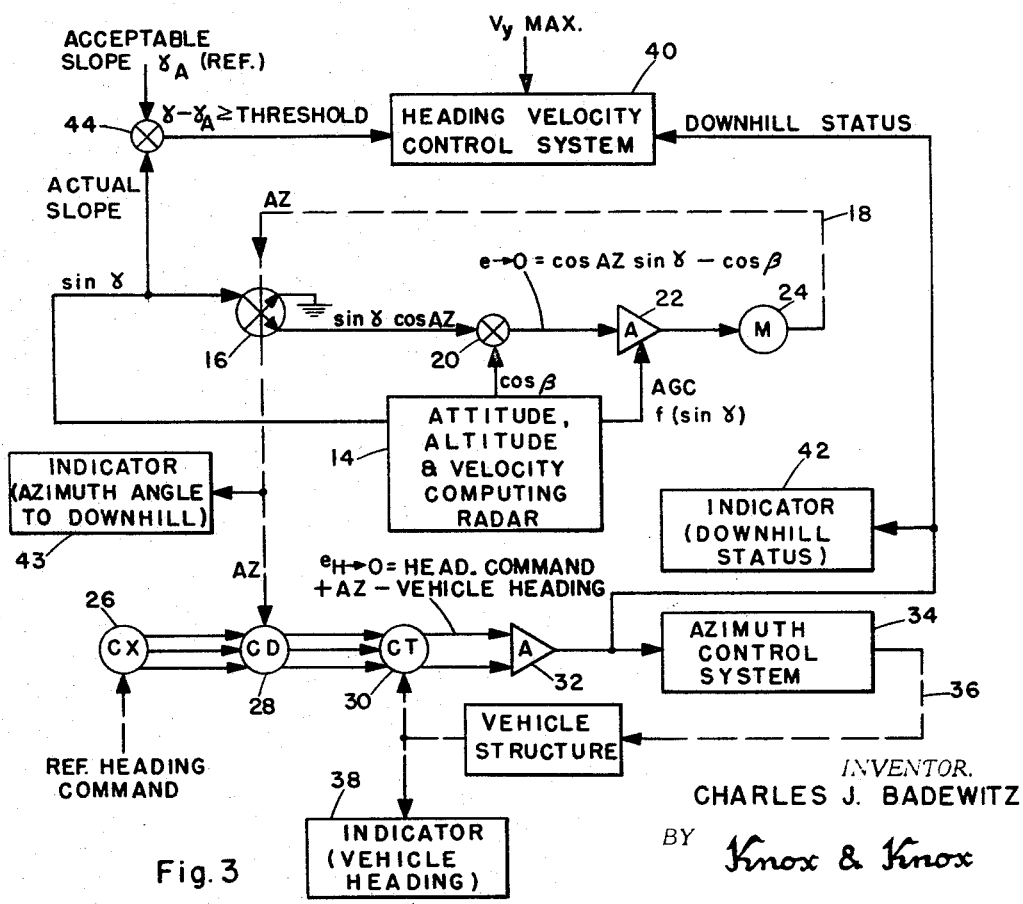
FIGURE 3 is a block diagram of the basic system.

In the system shown in FIGURE 3, a signal from computer 14, proportional to sin $\gamma$, is fed to a resolver 16, the moving component of which is driven through a feedback loop 18 by an amount proportional to AZ. In the feedback loop the output of resolver 16, which is proportional to sin $\gamma$ cos AZ, is applied to a mixer 20 together with a signal from computer 14 proportional to cos $\beta$. The output of mixer 20 is then an error signal corresponding to cos AZ sin $\gamma$— cos $\beta$, which is amplified by amplifier 22 and used to operate a servo motor 24 which drives the resolver 16 through feedback 18 to complete the azimuth angle control loop. Amplifier 22 is stabilized by automatic gain control (AGC) as a function of sin $\gamma$, derived from computer 14. The purpose of the AGC is to keep the control loop tight when the resolver input, sin γ, is very small. This ensures that the azimuth heading control will be positive and accurate when γ is near zero as at, say, 10 degrees.

The vehicle control portion of the system includes a synchro transmitter 26 to which is applied a heading command reference signal, representing the heading of the vehicle prior to initiation of the landing sequence, or some predetermined heading. The output of the synchro transmitter 26 is applied to a synchro differential 28, the moving component of which is driven by the feedback signal AZ, the output of the differential being fed to a synchro transformer 30. The output of synchro transformer 30 is amplified by amplifier 32 and used to operate the vehicle's azimuth control system 34, usually incorporating directional thrusters of some type, the reaction being fed back through the vehicle structure to the synchro transformer to complete the vehicle control loop 36. The feedback can also be applied to a vehicle heading indicator 38 for readout or recording. All of the synchro components and their operation are well known, as is the technique of directional control of a vehicle of this type.

It will be seen that the output of synchro transformer 30 is a heading error signal $e_H$, corresponding to the heading command, plus AZ and minus the actual vehicle heading. This amplified error signal represents the downhill status and is used as a control function to the vehicle's heading velocity control system 40 to ensure that the vehicle is moved laterally only when actually headed downhill. The downhill status signal may also be used to operate an indicator 42 for readout or recording and feedback loop 18 can be coupled to an azimuth angle indicator 43.

Determination of acceptable slope is obtained by applying the input sin γ to a mixer or comparator 44, together with a reference acceptable slope signal $γ_A$, which represents the maximum slope on which the vehicle can safely land and establishes a threshold. If the measured slope exceeds the acceptable slope, the output of comparator 44 will be a difference signal sin $γ-γ_A$ in excess of the threshold, which signal is used to actuate the control system 40 to move the vehicle in the downhill direction. Lateral velocity is limited by an input $V_y$ max, representing the maximum desirable velocity of translation in order to maintain positive control. When difference signal sin $γ-γ_A$ drops below the preset threshold, meaning that the slope has decreased to an acceptable degree, the vehicle is brought to a hovering condition. Lateral control is normally accomplished by some type of thrusters and the operation and control are well known.

Figure 4:
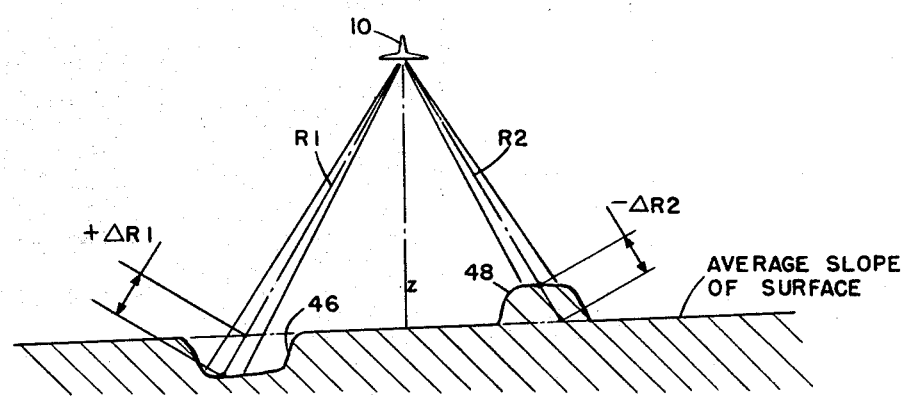
FIGURE 4 is a diagram showing the effect of local obstructions.

From FIGURE 4 it can be seen that a false reading of surface slope can occur with the radar beams stationary. A depression 46, a protuberance 48, or a combination thereof directly in the path of one or more beams could cause slant range measurements which would indicate a slope considerably in excess of the actual average slope of the surface. To avoid this the antenna can be simply rotated with an oscillating motion to scan the beams over the surface. By having the axis of the beam inclined to the axis of the beam pattern by a small amount, the beams will scan on different arcs and cover a greater area, as in FIGURE 5. Or, by changing the inclination of the scan axis while scanning, the beams can be made to scan in overlapping arcs for even more extended surface examination, to include all of the small area on which the vehicle will actually land.

Figure 5:
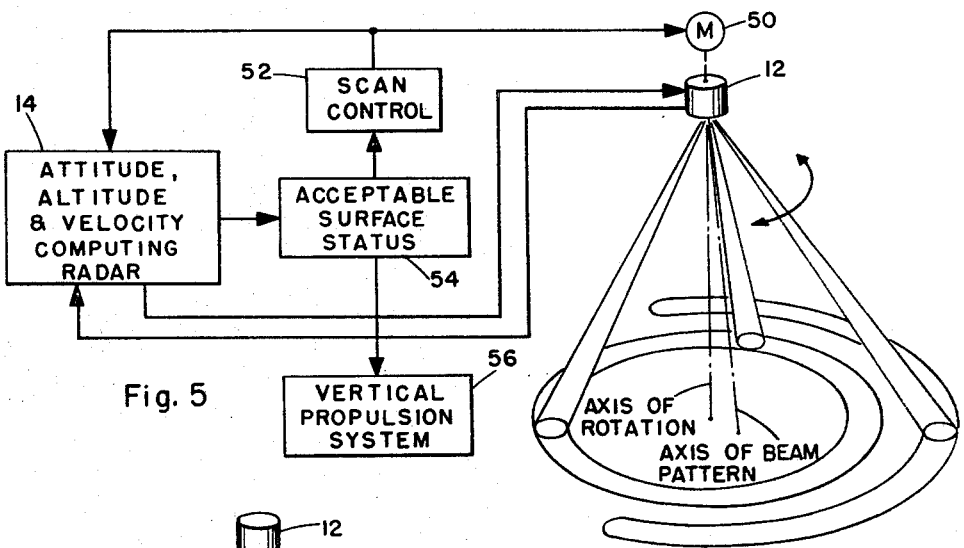
FIGURE 5 is a diagram of the scanning operation for detecting local obstructions.
Figure 6:
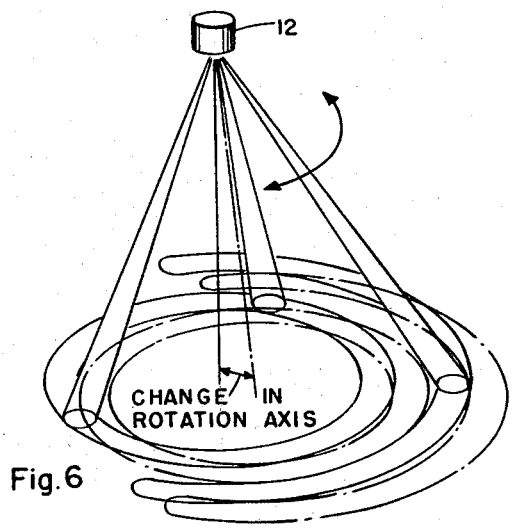
FIGURE 6 is a diagram of an extended scanning pattern which can be used.

In FIGURE 5, a motor 50, driving the antenna 12 for scanning, is operated by a scan control unit 52 which is actuated by receipt of an acceptable slope status signal from unit 54, the signal being derived from the system of FIGURE 3. The scan control unit 52 is also coupled to computer 14 to synchronize the computer with the changing orientation of the beams during scanning. Scanning could also be accomplished electronically, as could the tilting of the beam axis shown in FIGURE 6, depending on the type of antenna being used.

For a smooth surface the indicated average slope will remain constant, the individual beam signals varying smoothly during scan. Sharp discontinuity in the surface will cause a sudden transient in the return signals, range increase indicating a depression and a range decrease indicating a protuberance, such as a boulder. In the above mentioned copending application, each beam is analyzed by an individual frequency tracker, so it is a simple matter to determine which beam is affected by a discontinuity. Also, by knowing the orientation of the beams at all times, the location of each discontinuity can be determined. This continuous computation is well within the capacity of a simple computer, such as used in the copending application.

When the surface roughness is determined to be acceptable, the acceptable status unit 54 will stop the scan and actuate the vertical propulsion system, allowing the basic radar to guide the vehicle through final descent to a landing. This can be a simple switching action initiated by the appropriate signals.

One example of the sequence of operations in landing is shown in FIGURE 7. In position A the vehicle is in normal descent and is brought to a hover in stable attitude at position B, the altitude above the surface being predetermined and controlled by the basic radar guidance system. At position B the terrain slope is determined to be too steep and the vehicle is moved in the downhill direction to position C, where the terrain is substantially level. If the vehicle has equal maneuverability in all lateral directions it will not be necessary to rotate the vehicle to the downhill direction, so conserving fuel. By scanning the area at position C a local depression is detected, which could cause toppling of the vehicle if landed at that location, so the vehicle moves further on the same downhill heading to position D, where the surface is found to be acceptable. Final vertical descent and landing at position E is then controlled by the guidance radar. The entire operation is automatic and may only take a few seconds, unless the terrain is particularly rough.

This sequence is merely one example and is applicable to a vehicle which can be conveniently hovered. The hovering is not essential to the operation since the surface analysis and even the scanning can be accomplished while the vehicle is moving, either vertically or in a trajectory approaching the surface. With the guidance system described in the above mentioned copending application, the computer is continually supplied with all pertinent data, including an inertial vertical reference, with which the terrain analysis data can be co-ordinated. If a system of this type is used, the vehicle need not even be stabilized in attitude relative to local vertical, since the inertial vertical reference in space will suffice. However, other types of guidance systems may require attitude stabilization, the present system being adaptable to either arrangement.

While the system is described as utilizing radar, it will be evident that laser, infra-red, or other radiant energy apparatus may be used. Recent developments have shown that such apparatus can be used in place of radar and may even have advantages over microwave systems in certain instances. Similarly, the analog type computer apparatus shown is merely an example and the functions could be handled by digital means, the relative characteristics and substiution of one for the other being well known.

It is understood that minor variation from the form of the invention disclosed herein may be made without departure from the spirit and scope of the invention, and that the specification and drawings are to be considered as merely illustrative rather than limiting.

I claim:
1. In a flight vehicle having vertical propulsion and directional control means; radar guidance means coupled to said propulsion and control means and providing a vertical reference; said radar means including an antenna directing multiple radar beams to the terrain below the vehicle, with means to measure the ranges along individual beams and determine therefrom the slope of the terrain relative to the vehicle and to local vertical; the improvement comprising:

azimuth computing means coupled to said radar guidance means to determine the azimuth of the downhill direction of terrain slope relative to the vehicle and provide an azimuth signal;

a reference source of signal representing the maximum acceptable terrain slope;

means to compare the reference slope with the actual slope measured by said radar means and provide a difference signal;

and control actuating means responsive to said difference signal and said azimuth signal to actuate said directional control means and cause the vehicle to move in the downhill direction until the measured slope is less than the reference maximum slope.

2. The system according to claim 1, and including scanning means connected to said antenna and being responsive to said difference signal to initiate scanning of the radar beams over the terrain, for detection of local obstructions, when an acceptable terrain slope is determined.

3. The system according to claim 2, wherein said scanning means has an effective axis of scan rotation inclined to the vertical axis of the vehicle, whereby the beams sweep different arcs over the terrain.

4. The system according to claim 2, wherein said radar means is coupled to said scanning means to follow the scanning motion of the beams and thereby determine the location of local obstructions detected by the individual beams.

5. The system according to claim 1, wherein said azimuth computing means includes a resolver having an input from said radar means proportional to the inclination of the terrain surface relative to the vehicle vertical axis;

a mixer having as inputs the output of said resolver and an input from said radar means proportional to the inclination of the terrain surface relative to another, orthogonal axis of the vehicle, said mixer providing an output representing an azimuth error signal relative to the last mentioned vehicle axis;

an amplifier amplifying said error signal;

and a feedback loop from said amplifier to said resolver, to drive the resolver in response to the azimuth error signal.

6. The system according to claim 1, wherein said control means includes a source of reference heading command signal;

means to compare said reference signal with said azimuth signal and provide a heading error signal;

and means responsive to said error signal to direct the vehicle to the computed azimuth.

7. The system according to claim 6, wherein said means responsive to said error signal includes means to actuate said directional control means and cause the vehicle to move at a predetermined velocity in the downhill direction only when the vehicle is on the correct azimuth.

References Cited

UNITED STATES PATENTS 3,362,024   1/1968   Badewitz _____ 343—7

RODNEY D. BENNETT, Jr., Primary Examiner.

T. H. TUBBESING, Assistant Examiner

U.S. Cl. X.R.

343—7